(12) United States Patent
Pirrwitz et al.

(10) Patent No.: US 10,608,820 B2
(45) Date of Patent: Mar. 31, 2020

(54) IDENTIFICATION AND/OR AUTHENTICATION SYSTEM AND METHOD

(71) Applicants: Bjoern Pirrwitz, Sofia (BG); Daniele Vantaggiato, Mestre (IT)

(72) Inventors: Bjoern Pirrwitz, Sofia (BG); Daniele Vantaggiato, Mestre (IT)

(*) Notice: Subject to any disclaimer, the term of this patent is extended or adjusted under 35 U.S.C. 154(b) by 22 days.

(21) Appl. No.: 15/555,480

(22) PCT Filed: Mar. 2, 2016

(86) PCT No.: PCT/EP2016/054369
§ 371 (c)(1),
(2) Date: Sep. 1, 2017

(87) PCT Pub. No.: WO2016/139222
PCT Pub. Date: Sep. 9, 2016

(65) Prior Publication Data
US 2018/0048472 A1 Feb. 15, 2018

(30) Foreign Application Priority Data
Mar. 2, 2015 (EP) .................................... 15157247

(51) Int. Cl.
*H04L 29/06* (2006.01)
*H04L 9/32* (2006.01)
(Continued)

(52) U.S. Cl.
CPC .......... *H04L 9/3228* (2013.01); *H04L 9/0861* (2013.01); *H04L 9/0894* (2013.01);
(Continued)

(58) Field of Classification Search
CPC ... H04L 9/3228; H04L 9/0861; H04L 9/0894; H04L 9/14; H04L 63/0815;
(Continued)

(56) References Cited

U.S. PATENT DOCUMENTS 7,117,528 B1 * 10/2006 Hyman .................. H04L 63/08
726/5
9,148,284 B2 * 9/2015 Vantaggiato .......... H04L 9/3213
(Continued)

OTHER PUBLICATIONS

International Search report dated Apr. 13, 2016 in PCT/EP2015/054369; 3 pages.
(Continued)

*Primary Examiner* — John B King
(74) *Attorney, Agent, or Firm* — Fattibene and Fattibene LLC; Paul A. Fattibene

(57) ABSTRACT

The present invention relates to an authentication method which allows a user having a personal electronic device (PED) to authenticate, register or login to a recipient system. Upon interacting with the recipient system, the user is prompted for his unique token ID. The recipient system generates a one-time password (OTP) and sends it to the authentication server together with the token ID and may, in addition, request user's information. The authentication server sends an authentication request to the user's PED including the OTP, which prompts the user for a decision to proceed or not. The user, may decide to proceed with authentication, upon which the PED sends to the recipient system the OTP and a random password created by a previous handshake between recipient system and PED, (RP) stored in the PED, the recipient system authenticating the user thereby by comparing the OTP generated and received and the RP stored and received. If user information was requested, it will be provided to the recipient system together with the authentication data, i.e. the OTP and the RP.

15 Claims, 9 Drawing Sheets

(51) Int. Cl.
*H04L 9/08* (2006.01)
*H04L 9/14* (2006.01)

(52) U.S. Cl.
CPC ............ *H04L 9/14* (2013.01); *H04L 63/0815* (2013.01); *H04L 63/0838* (2013.01); *H04L 63/0876* (2013.01); *H04L 63/1475* (2013.01); *H04L 63/18* (2013.01); *H04L 2463/082* (2013.01)

(58) Field of Classification Search
CPC ............ H04L 63/0838; H04L 63/0876; H04L 63/1475; H04L 63/18; H04L 2463/082
See application file for complete search history.

(56) References Cited

U.S. PATENT DOCUMENTS

| | | | | |
|---|---|---|---|---|
| 9,191,386 | B1* | 11/2015 | Yaron | G06F 21/31 |
| 10,389,531 | B2* | 8/2019 | Toyonaga | H04L 63/0876 |
| 2002/0095507 | A1* | 7/2002 | Jerdonek | H04L 9/3271 709/229 |
| 2002/0095569 | A1* | 7/2002 | Jerdonek | H04L 9/32 713/155 |
| 2002/0164031 | A1* | 11/2002 | Piikivi | G06Q 20/12 380/270 |
| 2006/0282660 | A1* | 12/2006 | Varghese | G06Q 20/341 713/155 |
| 2007/0125840 | A1* | 6/2007 | Law | G06Q 20/10 235/379 |
| 2008/0086759 | A1* | 4/2008 | Colson | G06F 21/34 726/2 |
| 2008/0098464 | A1* | 4/2008 | Mizrah | G06F 21/36 726/5 |
| 2008/0207171 | A1 | 8/2008 | Van Willigenburg et al. | 455/411 |
| 2008/0301460 | A1 | 12/2008 | Miller et al. | 713/183 |
| 2009/0024506 | A1* | 1/2009 | Houri | G06Q 20/40 705/35 |
| 2009/0089869 | A1* | 4/2009 | Varghese | G06F 21/31 726/7 |
| 2009/0172402 | A1* | 7/2009 | Tran | G06Q 20/102 713/170 |
| 2009/0249076 | A1* | 10/2009 | Reed | G06Q 30/00 713/181 |
| 2009/0328165 | A1* | 12/2009 | Cook | G06F 21/445 726/6 |
| 2009/0328168 | A1* | 12/2009 | Lee | G06F 21/34 726/6 |
| 2010/0042847 | A1* | 2/2010 | Jung | G06F 21/43 713/183 |
| 2010/0180328 | A1* | 7/2010 | Moas | G06F 21/34 726/6 |
| 2010/0199089 | A1* | 8/2010 | Vysogorets | G06F 21/34 713/168 |
| 2011/0060913 | A1* | 3/2011 | Hird | G06F 21/34 713/184 |
| 2011/0078031 | A1* | 3/2011 | Mardikar | G06Q 20/20 705/17 |
| 2011/0145570 | A1* | 6/2011 | Gressel | H04L 63/0421 713/159 |
| 2012/0005474 | A1* | 1/2012 | Bourret | G06F 21/34 713/150 |
| 2012/0030047 | A1* | 2/2012 | Fuentes | G06Q 20/04 705/26.1 |
| 2012/0124651 | A1 | 5/2012 | Ganesan et al. | 726/4 |
| 2012/0144461 | A1* | 6/2012 | Rathbun | H04L 9/3213 726/5 |
| 2012/0240204 | A1* | 9/2012 | Bhatnagar | G06F 21/35 726/5 |
| 2013/0124292 | A1* | 5/2013 | Juthani | G06F 21/41 705/14.26 |
| 2013/0124855 | A1* | 5/2013 | Varadarajan | G06Q 20/3276 713/155 |
| 2013/0276080 | A1* | 10/2013 | Nakonetzki | H04L 63/08 726/7 |
| 2014/0117075 | A1* | 5/2014 | Weinblatt | G06Q 20/02 235/375 |
| 2014/0298011 | A1 | 10/2014 | Ganesan | 713/159 |
| 2014/0337957 | A1* | 11/2014 | Feekes | H04L 63/0853 726/9 |
| 2015/0215310 | A1* | 7/2015 | Gill | H04L 63/0853 726/7 |
| 2016/0261411 | A1* | 9/2016 | Yau | H04L 63/0807 |

OTHER PUBLICATIONS

European Search report dated Aug. 25, 2015, with examination in corresponding application No. EP 15 15 7247; 8 pages.
SingleID—Welcome to the post-password era; Feb. 27, 2015; 7 pages.
Anonymous: SingleID White Pater; Aug. 19, 2015; 32 pages.

* cited by examiner

IDENTIFICATION AND/OR AUTHENTICATION SYSTEM AND METHOD

The present invention relates to a system and a method for performing authentication utilizing a personal electronic device.

BACKGROUND ART

Most websites and purchasing kiosks require a user to register and log-in in order to use the websites and to conduct transactions, change account information, or the like. Many websites attempt to profile visitors so as to either identify them or their demographic, thereby being able to tailor a displayed message accordingly.

Several methods of identifying users are known, such methods falling generally into either indirect or direct methods. Indirect methods include, for example, writing and reading cookies, tracking Internet Protocol (IP) address, and the like. Such indirect methods are relatively non-invasive but are much less accurate than direct methods.

Direct methods of identifying a user require a specific active recognition of the user that involves two steps: identification and authentication. Identification is a recognition step that essentially answers the question, "Who are you?" The user wanting to access an online system such as an e-commerce site, for example, must be able to either register as a new user or login as an existing user, typically by submitting a unique personal identifier such as an email address, user ID, membership number, or the like.

Authentication is a verification step that essentially answers the question, "How can you demonstrate you are really who you say you are?" Typically websites request a password, PIN code, or the like, ostensibly only known by the user and the website. Advanced authentication methods utilize biometric data such as fingerprints, iris characteristics, or the like.

Such systems traditionally rely on the authentication information to be kept as a secret and being difficult to guess. Further, users are frequently told not to use the same password on multiple websites. However, such requirements are difficult to enforce, and hence many people out of laziness will use the same easy-to-guess password on multiple sites, rendering their information less secure on all such sites.

Some of the drawbacks to such typical identification and authorization systems include the following:

1) Such websites (target websites for the user), such as e-commerce websites for example, herein referred to as recipient systems, must protect the user's personal information with adequate security measures. Storehouses of such information are often targets of hacking attacks for the purposes of fraudulently obtaining large sets of personal information such as names, addresses, credit card numbers, and the like.
2) Users must generate, carefully store and periodically update passwords for any such recipient systems, preferably always having unique passwords for each site that he wishes to access. This requires either an excellent and secure filing system or an extraordinary memory.
3) The user, in order to initially register at such websites and recipient systems, must transmit enough of his personal information to conduct his desired business at the website. For example, an e-commerce site user who desires to purchase an item and have it delivered to his home address, must communicate all of his generic information, such as name, address, phone number, email address, credit card information, and the like. Such data must be re-entered for every site, which is time consuming and prone to typing errors.
4) In the event that the user's information changes, such as his address or email address, the user must update such information on every website he wishes to conduct future business with. This is time consuming, and often the user will not remember if he has updated the information on a particular website, such as his shipping address for example. This can result in a user's shipment being mistakenly delivered to an old address.
5) Recipient systems that have stored personal information of many users often have the challenge that their information on many of their users is obsolete, making bulk mailings or email campaigns less efficient and effective.

One partial solution to some of these drawbacks is a so-called "single sign-on" method, which is based on a unique user account at a principal system, for example a social network platform such as Facebook, Linked-In, Twitter, or the like. In such a single sign-on system, to log into a recipient system for transacting some sort of business, for example, the user must first log-in to the principal system through the recipient system. Once the user has been identified and authenticated by the principle system, the principle system shares certain data with the recipient system and the recipient system establishes a user session with the user.

However, such single sign-on systems also have certain disadvantages, such as:

1) the principal system must be informed of the user's personal information, and the user may not desire such a principal system to have such personal information;
2) the principal system learns about all of the recipient systems that the user visits and transacts business with;
3) the recipient system must have a trust relationship with the principal system;
4) the user must trust both the principal system and the recipient system that proper sharing of the user's personal data is taking place;
5) the principal system, typically being a social network platform, learns about the recipient systems that the users' friends or contacts frequent as well, which raises additional privacy and trust issues between all of the principal system's users; and
6) the login ID and passwords of users on the recipient systems become more valuable, and hence a more attractive hacking target, with every recipient system the user accesses through the principal system, requiring increased security and resulting in greater risk if such login credentials are compromised.
7) by bolting on to the principal system the user creates a single point of failure. If the login data for the principal system are lost or compromised then the login ID's for all the recipient systems associated to the login ID of the principal system are also lost or compromised.

Similar problems occur for authentication applications in which a mere transaction confirmation is required such as in financial operations, the access to buildings, machines or vehicles, the rental of vehicles or of any equipment, or the like.

Therefore, there is a need for a system that reduces the burden of securing user information at recipient sites, thereby lowering their overhead costs for such recipient systems.

SUMMARY OF THE INVENTION

Thus, based on the above disadvantages, the aim of the present invention is to provide a system which would enable reliable authentication without requiring separate authentication information to be provided by the user for the respective recipient systems.

This is achieved by the features of the independent claims.

Further particularly advantageous embodiments of the present invention are provided by the features of the dependent claims.

The present invention may reduce the burden on the user of having to remember multiple, unique, and complex passwords, one for each recipient system he wishes to use. It may further eliminate the need for the user to enter his personal information at every site, and updating his information across all of the sites he uses would also be streamlined. Further, this results in the personal information of each user being more current in any given recipient system.

It is the particular approach of the present invention to provide authentication at the recipient system by means of generating two different random codes, one provided to the PED via an authentication server and the other one provided to the PED directly by the recipient system. When the PED is authorized by the user, it provides both random codes to the recipient system which checks their authenticity and if affirmative, confirms the authentication of the user.

In accordance with an embodiment of the present invention, an authentication system is provided for allowing a user having a personal electronic device, PED, to authenticate, register and/or login to a recipient system via a network, the system comprising: the recipient system configured to: receive a unique token ID from the user; to send the token ID to an authentication server and to generate a one-time password, OTP; to send the token ID together with the OTP to the authentication server; to generate and store a random password, RP, as response to the final handshake between the recipient system and PED (i.e. in response to a previous successful authentication); to receive directly from the PED an RP together with an OTP (and, in some embodiments, the user data to identify the user thereby); to authenticate the user by comparing the generated OTP with the received OTP and the generated RP with the received OTP (and in some embodiments also subsequently register and login the user into the recipient system if the authentication was successful). Moreover, the authentication system includes an authentication server in communication via the network with both the PED and the recipient system, the authentication server configured to receive from the recipient system the user's token ID and the OTP; and send an authentication request to the user's PED for a decision of the user to proceed with authentication at the recipient system or not, the request including the OTP. Moreover the authentication system includes the PED configured to store a random password, RP, received from the recipient system in a previous handshake; prompt the user for a decision to proceed or not with authentication at the recipient system; and to send the RP and the OTP to the recipient system, if authorized by the user.

It is noted that the authentication server may assign to the user the token ID based on a unique identifier of the user's PED and/or some random component and/or a hash function. The unique identifier may be, for instance, a telephone number, the UUID number, and/or the MAC address or any other identifier.

The user (or the user's PED) may be prompted for his unique token ID in response to a transaction request by the user. However, the token ID of the user may also be received by the recipient system once and stored there in association with other user's identifier.

The PED may store user data in a memory accessible thereto and be configured to retrieve the user data from the memory and provide them to the recipient system if authorized by the user. This provides the advantage that the user data are not stored in the authentication server or anywhere else except in the user's PED. However, it is noted that the storing and providing of the user data is only one of non-limiting embodiments of the invention.

In accordance with another embodiment of the invention, an authentication method is provided for allowing a user having a personal electronic device, PED, to authenticate, register and/or login to a recipient system, the method comprising the steps: a) the recipient system receiving the user's unique token ID; b) the recipient system, upon receiving a user's request for authentication generating a one-time password, OTP, and communicating to the authentication server the token ID and the OTP (and, in some embodiments, the request for transmission of certain personal data stored in the PED by the user); c) the authentication server sending an authentication request to the user's PED including the OTP, the PED prompting the user for a decision to proceed or not with authentication at the recipient system, (and, in some embodiments, to approve the transmission of certain personal data stored in the PED by the user); d) the PED enabling the user deciding to proceed with authentication (and, in some embodiments, with the transmission of certain personal data stored in the PED by the user); d) the PED sending the stored random password, RP, and the OTP received from the authentication server (and, in some embodiments, certain personal data stored in the PED by the user) to the recipient system; and e) the recipient system receiving directly from the PED the RP together with the OTP, (and, in some embodiments, certain personal data stored in the PED by the user) and f) the recipient system authenticating the user by comparing the generated OTP with the received OTP and the stored RP with the received RP (and, in some embodiments, subsequently registering and logging-in the user into the recipient system) if the authentication was successful.

In compliance with the above described system, the corresponding component apparatuses and methods are also provided. In particular, an authentication method for allowing a user having a personal electronic device, PED, to authenticate, register and/or login to a recipient system, the method to be performed on the recipient system and comprising the steps of: upon receiving a request from the user, receiving from the user his unique token ID (which may be performed once and the token ID is then stored in the recipient system, or the recipient system may prompt the user to enter his token ID at each authentication occurrence and, in some embodiments, the request for transmission of certain personal data stored in the PED by the user); upon receiving the user's token ID, generating a one-time password, OTP, (and, in some embodiments, the request for transmission of certain personal data stored in the PED by the user) and communicating to the authentication server the user's entered token ID and the OTP (and, in some embodiments, the request for transmission of certain personal data stored in the PED by the user); receiving from the PED the RP (provided that a previous handshake between the recipient system and the PED has already occurred) together with the OTP (and, in some embodiments, the user data to identify the user thereby); and authenticating the user by comparing the generated OTP with the received OTP and the stored RP with the received RP (and, optionally, registering and logging-in the user subsequently into the recipient system if the authentication was successful).

Similarly, a recipient system is provided having means to perform the above authentication method to be performed on the recipient system. These means may be a processor which implements these steps together with the memory means for storing the OTP and the RP respectively. However, it is noted that the present invention is not limited to the recipient system with a single one processor to perform the above steps. Rather, the recipient system may be distributed so that a separate processor performs, for instance, the tasks connected with communication with the user (token ID prompting and receiving) and the tasks connected with authentication and receipt of data and passwords from the PED. Any other distribution of tasks is also possible. The processor or processors may be any processing devices including general, programmable or specialized hardware.

Similarly, an authentication method is provided for allowing a user having a personal electronic device, PED, to register and/or login to a recipient system, the method to be performed on the PED and including the steps of: receiving from the authentication server a request for authentication including the OTP (and, in some embodiments, the request for transmission of certain personal data stored in the PED by the user); prompting the user to confirm the authentication request, and, in some embodiments, whether or not he authorizes the PED to provide the recipient system with the user data requested; if the user confirms the authentication request and authorizes the PED to do so, then sending the confirmation of the authentication request together with the OTP received from the authentication server and the RP stored (and, in some embodiments, the requested user data to the recipient system.

The corresponding PED apparatus is also provided having means for performing the steps described above. The means may be a processor or processors and the corresponding memory with logically or physically separated memory portions storing the RP and the user data.

A computer-readable storage medium is also provided, storing a set of instructions that, when executed by at least one processor, cause the at least one processor to perform operations, comprising the steps of method described above. It is noted that the computer-readable storage medium can also be distributed, i.e. include storages in the recipient system, user's PED as well as in the authentication server.

The above and other objects and features of the present invention will become more apparent from the following description and preferred embodiments given in conjunction with the accompanying drawings in which:

FIG. 10 is a sample interface screen of the mobile application showing a personal subset of the user's personal information;

FIG. 11 is a sample interface screen of the mobile application showing an economic subset of the user's personal information;

DETAILED DESCRIPTION

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
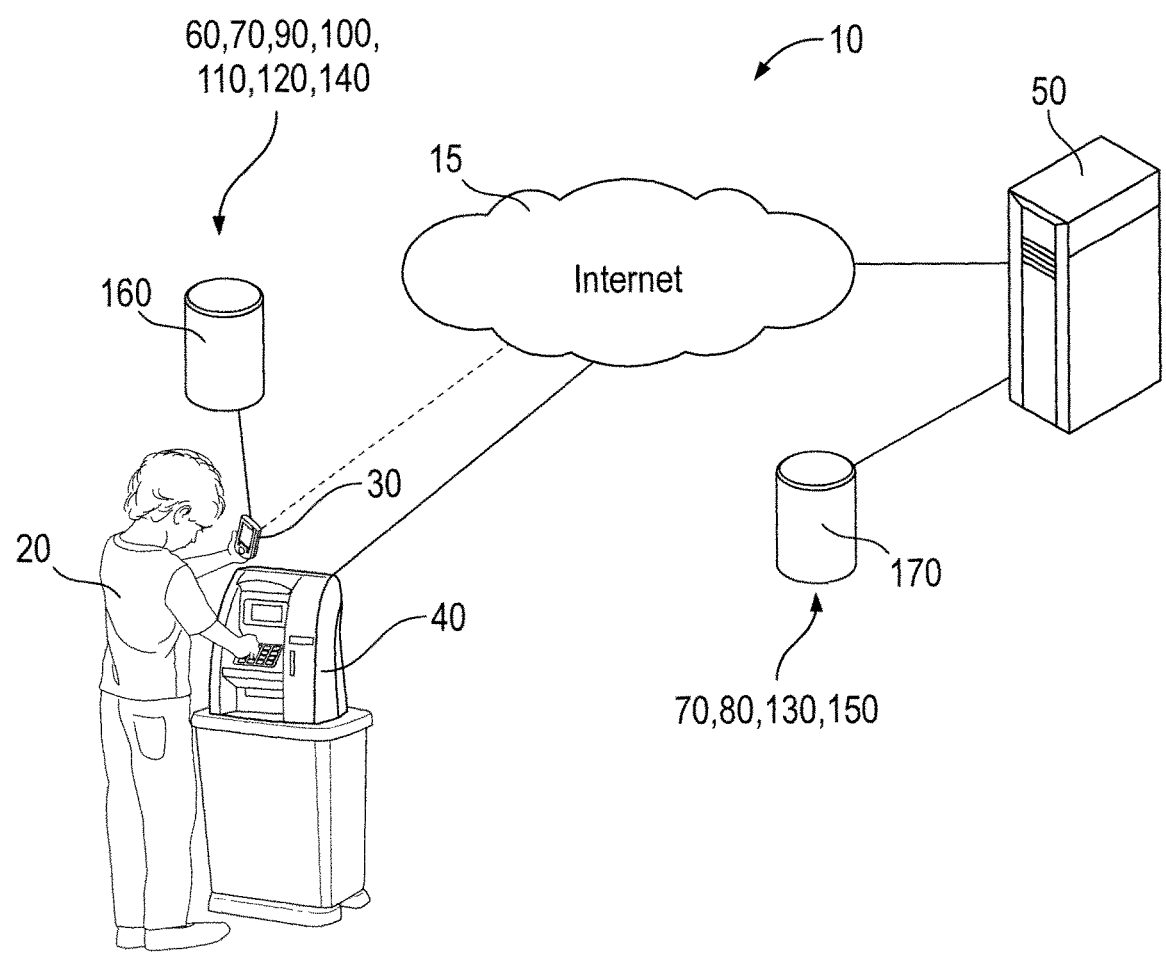
FIG. 1 is a network diagram illustrating a user and his personal electronic device (PED), a recipient system, an authentication server, all mutually networked such as through the Internet.

FIG. 1 illustrates a network structure used by a computer-implemented authentication method 10 for allowing a user 20 having a personal electronic device 30, such as a mobile phone, laptop, tablet computer, or the like, to register and/or login to a recipient system 40, such as an e-commerce website, utilizing either another device such as a kiosk, ATM, remote workstation, computer, or even on the same personal electronic device 30. The method comprising the following steps, explained in detail below.

First, an authentication server 50 is provided that is able to communicate with the personal electronic device 30 (PED 30) and the recipient system 40 through a network 15. Such an authentication server 50 may be connected to the Internet, for example (FIG. 1), along with a PED 30 of the user 20 and the recipient system 40. For example, the user 20 may be attempting to purchase a gift card from an ecommerce kiosk 40.

Figure 12:
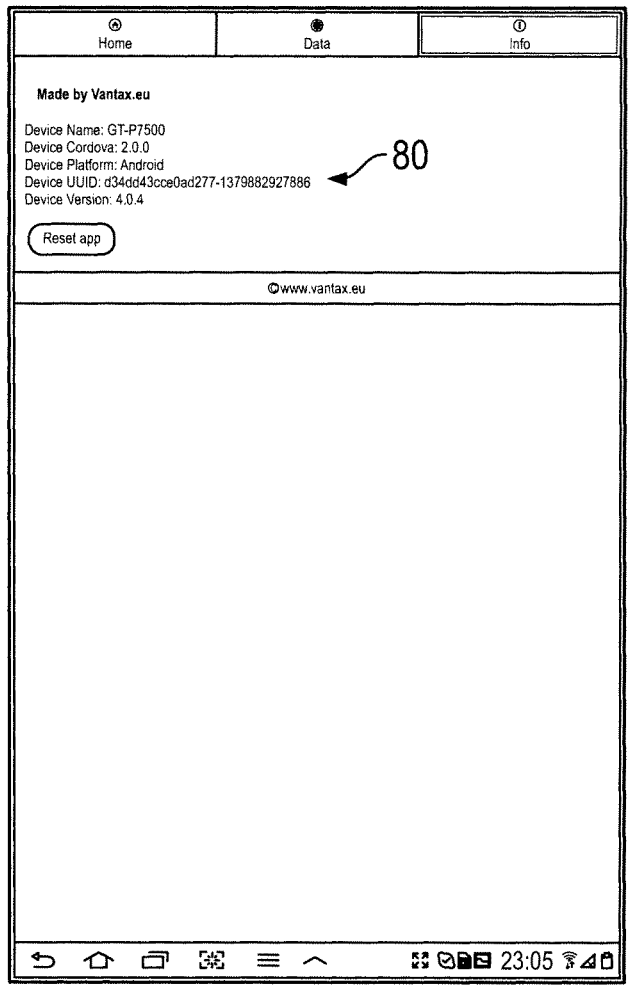
FIG. 12 is a sample interface screen of the mobile application showing a unique PED ID of the user's PED.

Before being able to use the authentication method 10, the user 20 must establish an account on the authentication server 50, and provide personal information 60 of the user 20 stored only on the PED 30 such as on a first non-transitory computer-readable storage medium 160 of the PED 30 or elsewhere, but not on the authentication server 50. The authentication server 50 uniquely identifies the user's personal electronic device 30, such as through a unique PED ID 80 (FIG. 12) or some function thereof, for example. The authentication server 50 communicates with the PED 30 through a mobile application 35, for example, running on the PED 30, such mobile application 35 being downloaded to the PED 30 by the user 20 from the authentication server 50 or elsewhere. The mobile application 35 communicates the unique PED ID 80 to the authentication server 50, preferably through an encrypted connection. Alternately, the PED 30 may communicate with the authentication server 50 through SMS text messages, a chat application, email, or the like. The personal information 60 of the user 20 is stored on or by the PED 30, preferably on the first non-transitory computer-readable storage medium 160, and only accessible thereby. The mobile application 35 preferably interacts with the authentication server 50 to establish the user account, whereby the user 20 does not need to interact with the authentication server 50 directly.

In one embodiment, the personal data 60 is encrypted with an encryption key 130 so that it becomes encrypted personal information 140. The encrypted personal information 140 is then stored on either the PED 30 or the non-transitory computer-readable storage medium 160, with the encryption key 130 being stored by the authentication server 50, preferably on a second non-transitory computer-readable storage medium 170.

The authentication method 10 establishes a unique token ID 70 for the user 20 which is preferably easy to remember and simple to type. The token ID 70 is preferably established by the authentication server 50 and stored on the PED 30 by the mobile application 35. The token ID 70 may be based on the unique PED ID 80, or alternately a combination of the unique PED ID 80 and a random token key 150 generated by the authentication server 50, such that the user 20 may reset the token ID 70 at will if he believes his token ID 70 has been fraudulently used, for example.

Figure 3:
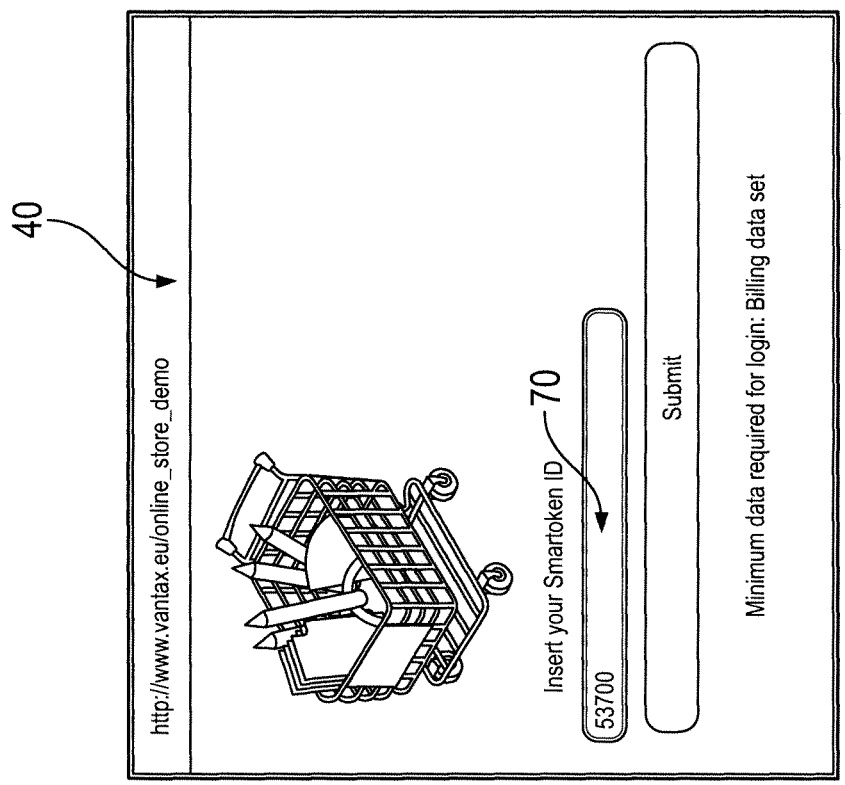
FIG. 3 is a sample interface screen of the recipient system prompting the user for a unique token ID of the user.
Figure 2:
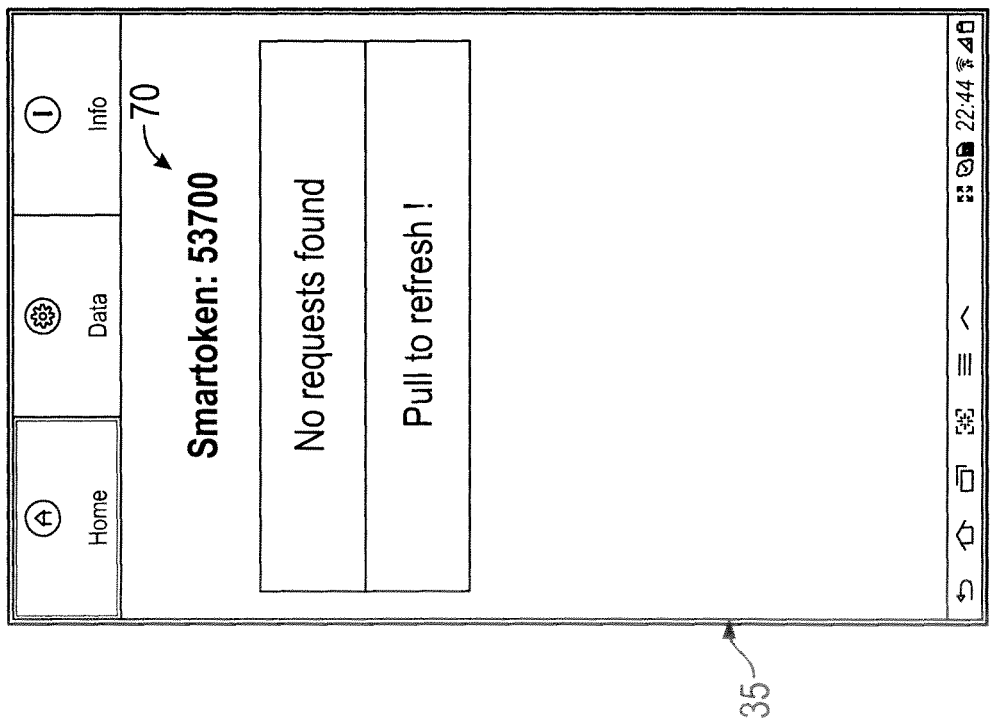
FIG. 2 is a sample interface screen of a mobile application running on the user's PED.

Upon interacting with the recipient system 40, the user 20 is prompted for his token ID 70 (FIG. 3). If the user 20 does not remember his token ID 70, he can activate the mobile application 35 on his PED 30 which displays the token ID 70 (FIG. 2), referred to as a Smartoken" in the illustrations by way of example. The mobile application 35 may also be password protected or protected with a biometric technique, as is known in the art, to reduce the chance of fraud if the user's PED 30 is lost or stolen, for example.

Figure 6:
FIG. 6 is a sample interface screen of the recipient system showing that the recipient system is waiting for authentication of the user.

The recipient system 40, upon receiving the user's token ID 70, communicates with the authentication server 50 to request login or registration information from the PED 30, referencing the user's token ID 70 (FIG. 6). A software application or module is resident on the recipient system 40 to provide instructions to the processor of the recipient system for performing the method 10.

The authentication server 50, upon receiving the information request from the recipient system 40, sends an authentication request 85 to the user's PED 30, which prompts the user 20 for a decision to proceed with authentication at the recipient system 40 or not, and if so, to select preferably a subset 90 of the user's personal information 60 that the PED 30 is authorized to submit to the recipient system 40. The authentication server 50 sends location or identification information of the recipient system 40 to PED 30, such as the IP address and port, or the like, of the recipient system 40, so that the PED 30 knows how or where to send the subset 90 of the user's personal information 60 to the recipient system 40.

If the user 20 decides not to proceed with authentication, such as if changing his mind about going forward with the transaction or if, for example, a malicious third party has fraudulently used the user's token ID 70 on the recipient system 40, the user declines to send the personal information 60 to the recipient system 40. The recipient system 40 eventually stops waiting for the personal information 60 and cancels the session, returning to a default waiting home screen or the like.

Figure 5:
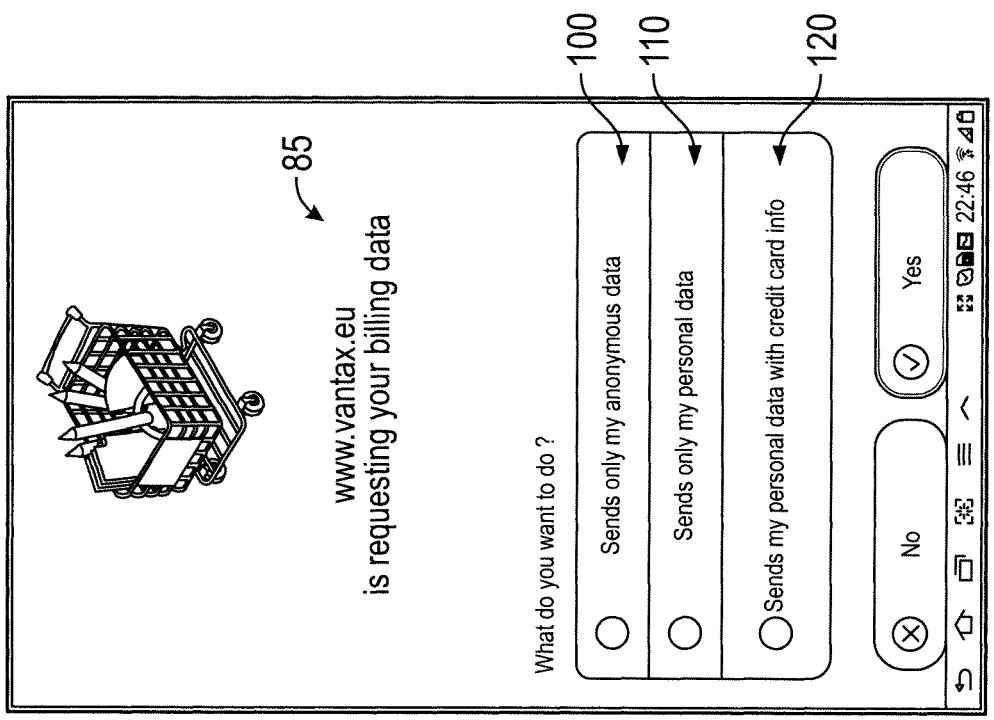
FIG. 5 is a sample interface screen of the mobile application prompting the user to take an action in response to the authentication request of the recipient system.
Figure 4:
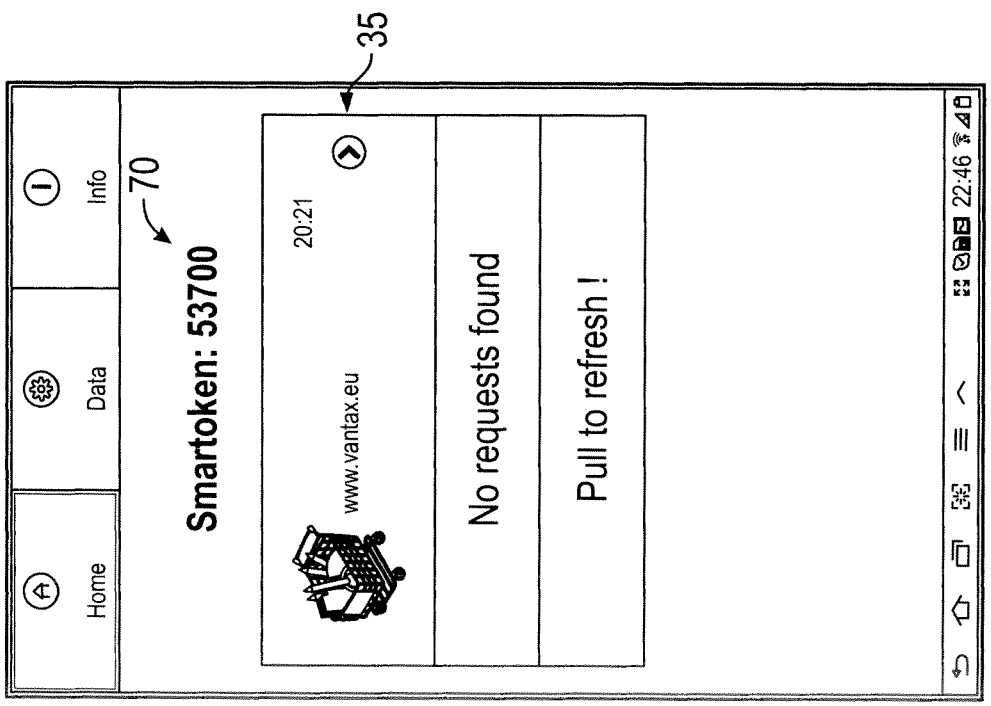
FIG. 4 is a sample interface screen of the mobile application showing any authentication requests received by the PED from the authentication server in response to submitting a token ID in the interface screen of FIG. 3.
Figures 10, 11:
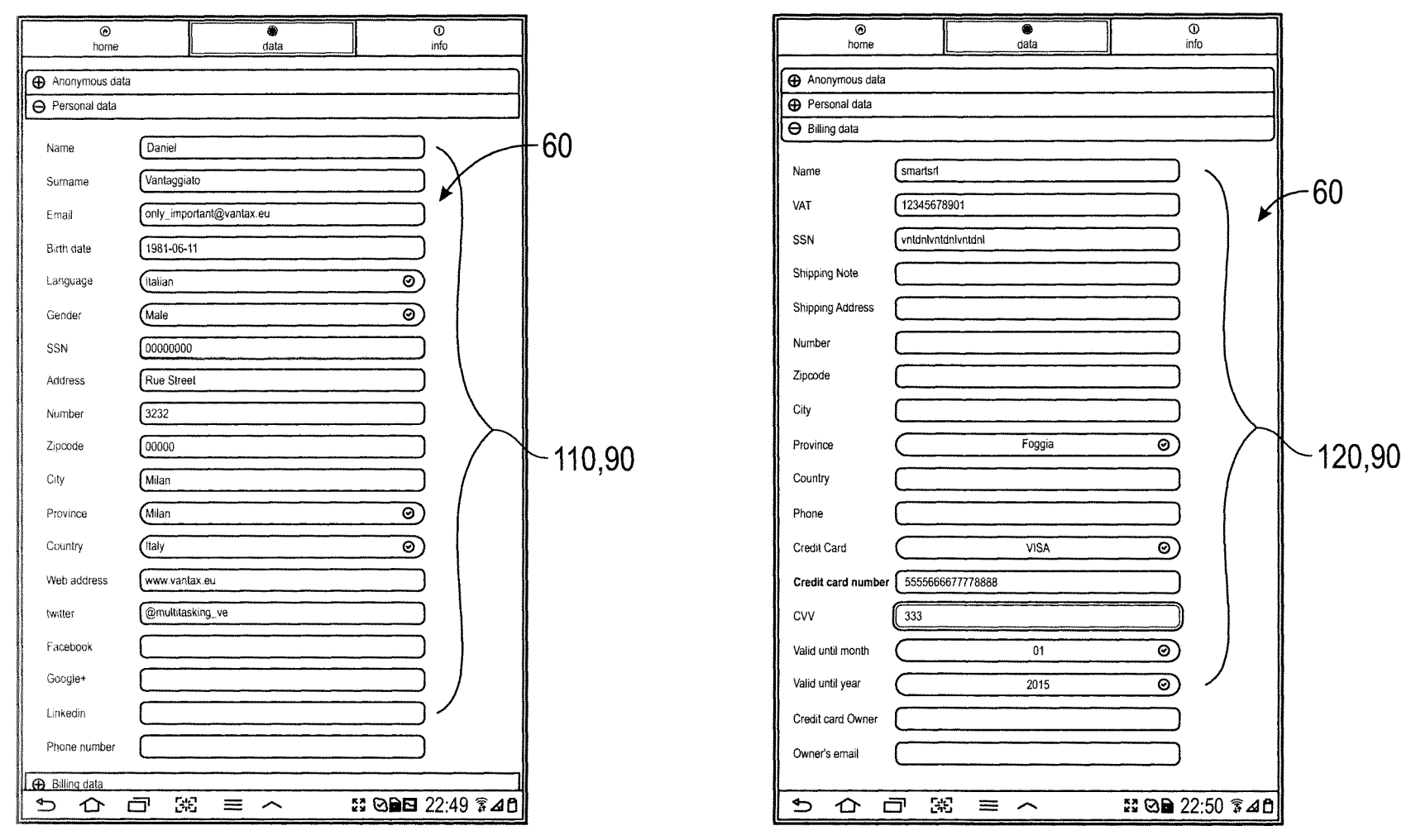

The user 20, if deciding to proceed with authentication, selects the subset 90 of the user's personal information 60 to send to the recipient system 40 and instructs the PED 30 to proceed (FIG. 5). The PED 30 retrieves the subset 90 of personal information 60 from the first non-transitory computer-readable storage medium 160 and sends the subset 90 of personal information 60 to the recipient system 40, preferably through an encrypted connection. In one embodiment, the user's personal information 60 is segregated into several different data sets, such as an anonymous subset 100 (FIG. 9), a personal subset 110 (FIG. 10), and an economic subset 120 (FIG. 11). As such, the user 20 can decide when prompted by the authentication server 50 which subset of the personal data 60 to send to the recipient system 40 (FIGS. 5 and 9-11). The anonymous subset 100 may include non-identifying information of the user 20, for example. The personal subset 110 may include contact identifying personal information 60 of the user 20, such as his name, address, phone numbers, email addresses, social media IDs, or the like. The economic subset 120 may include economic personal information 60 of the user 20, such as name, billing address, credit card information such as credit card number, expiration date, CSV code, and the like, useful for making a financial transaction.

Figure 7:
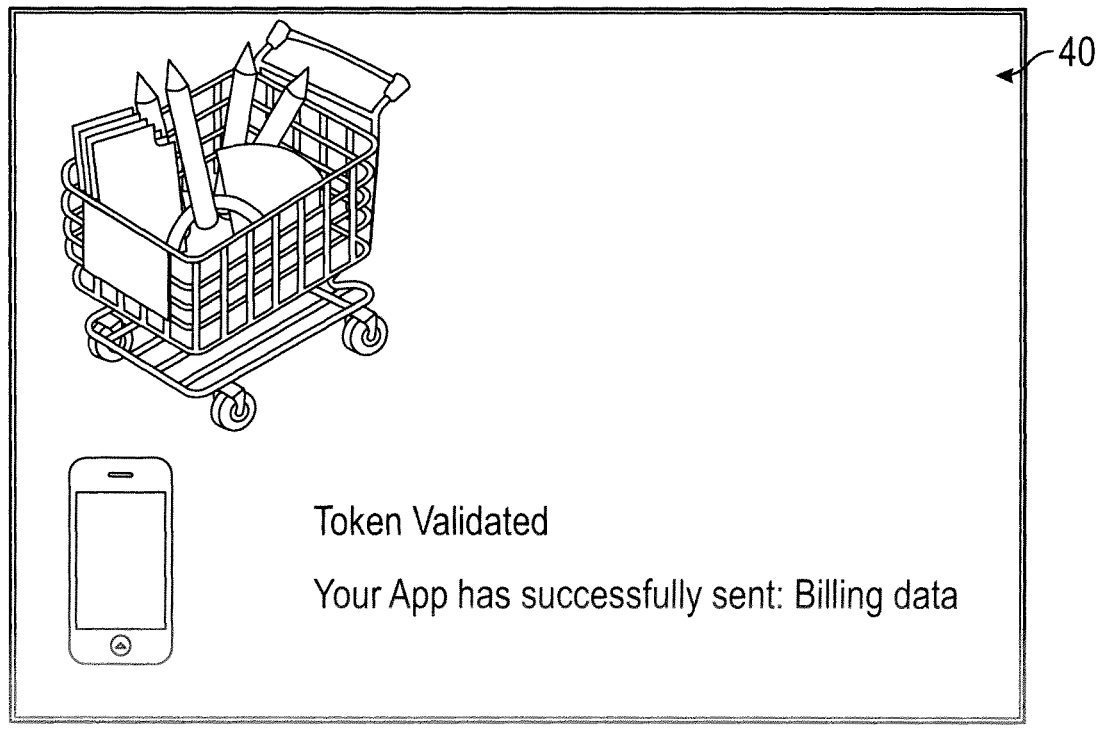
FIG. 7 is a sample interface screen of the recipient system showing that the user has been authorized and logged into the recipient system.
Figure 9:
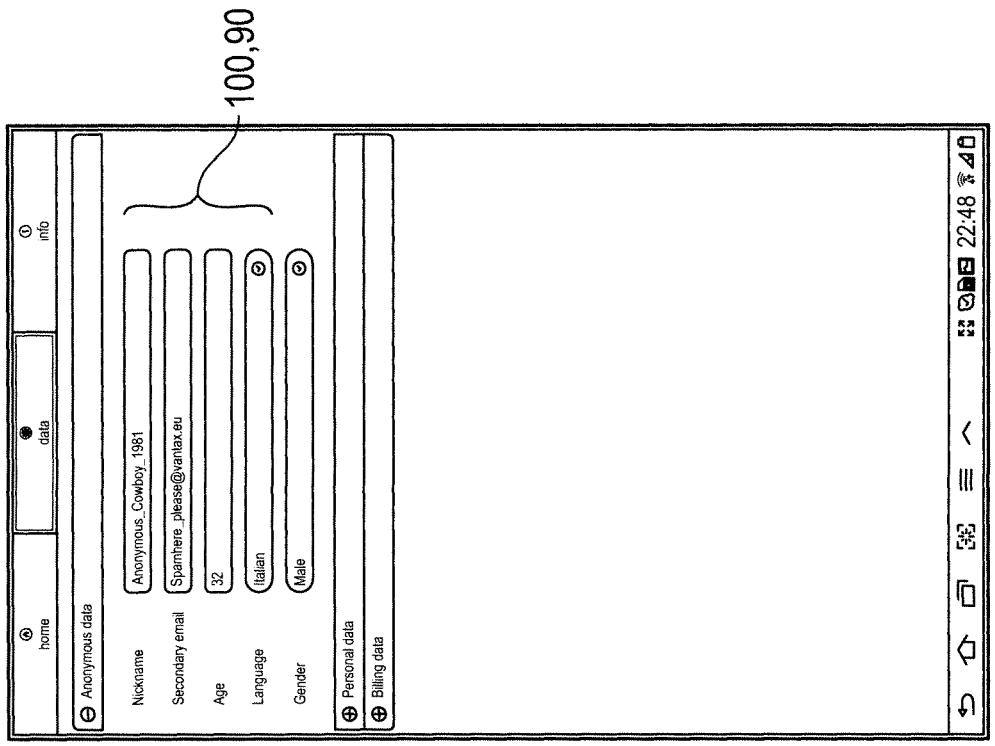
FIG. 9 is a sample interface screen of the mobile application showing an anonymous subset of the user's personal information.
Figure 8:
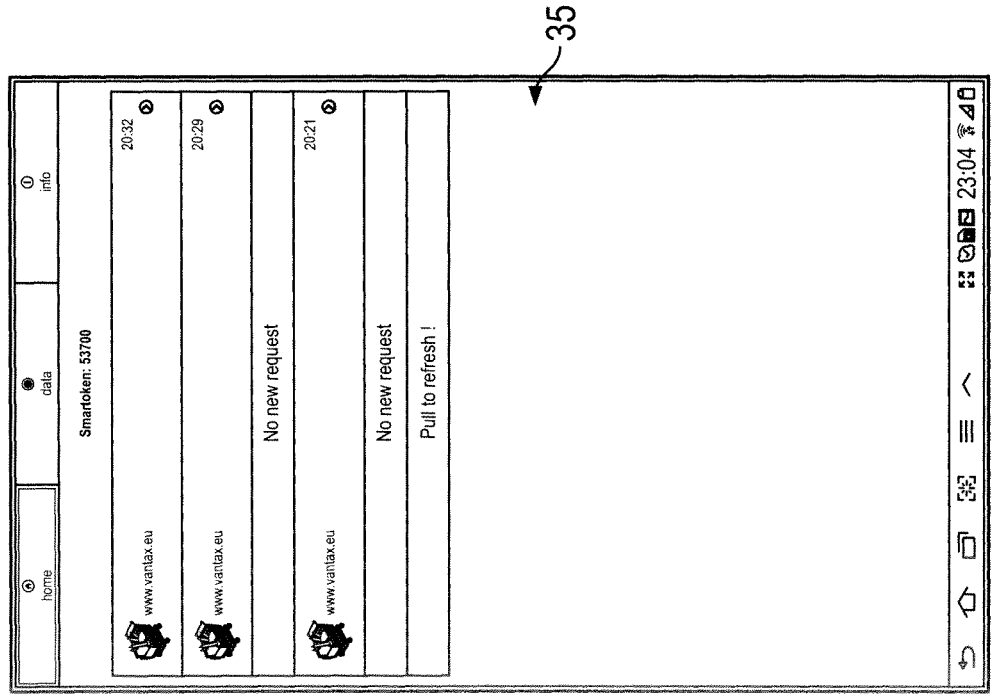
FIG. 8 is a sample interface screen of the mobile application showing a history of authentication requests.

The recipient system 40 receives the subset 90 of personal information 60 and identifies and/or authenticates the user 20 thereby, establishing a user session. The user 20 is subsequently registered and logged into the recipient system 40 (FIG. 7). After the user 20 performs a transaction, after a preset time of inactivity, or after the user 20 overtly logging off of the recipient system 40, the session ends and the user 20 would have to repeat the above process to log back into the recipient system 40.

In accordance with an embodiment of the present invention, the authentication server 50 stores the authentication key information, but does not store the data related to the user. For instance, the authentication server stores the user's token ID 70 and/or keys for decrypting the personal data, but does not store the user's personal information 60. The user's personal information 60 is only stored in the PED 30, for instance in a computer readable medium included within the PED 30 or an external computer readable medium which can be read by the PED 30 such as a memory card or a device with memory connectable to the PED 30 via Bluetooth or near field communication (NFC) or any other means. The separation of key and data information provides the advantage of better protecting the personal data by keeping them only on the PED 30 under the control of the user.

Advantageously, the device used by the user is additionally identified with a random code (for instance a one-time random code which changes after each usage). Accordingly, the recipient system 40 is configured to generate the random code. This configuration may be implemented, for instance by means of a plugin.

When a user wants to log in to the receipt system 40 and inserts his own user's token ID 70, the plugin generates a unique random code (RC) and sends this code to the authentication server 50 instead of or in addition to the user's token ID 70. The authentication server 50 then forwards the generated random code RC to the PED 30.

The forwarding of the RC to the correct PED may be ensured for instance by sending from the receipt system 40 to the authentication server 50 both the user's token ID 70 and the RC so that the authentication server will forward the RC to the PED associated to the corresponding token ID.

If the PED is instructed by the user to send the data, the PED then sends the data to the recipient system 40 together with the RC. The recipient system may then verify that the device that sent the RC is owned by the same person who logged in with the user's token ID 70, because no one else could have known the random code created by the recipient system 40 otherwise.

Figure 13:
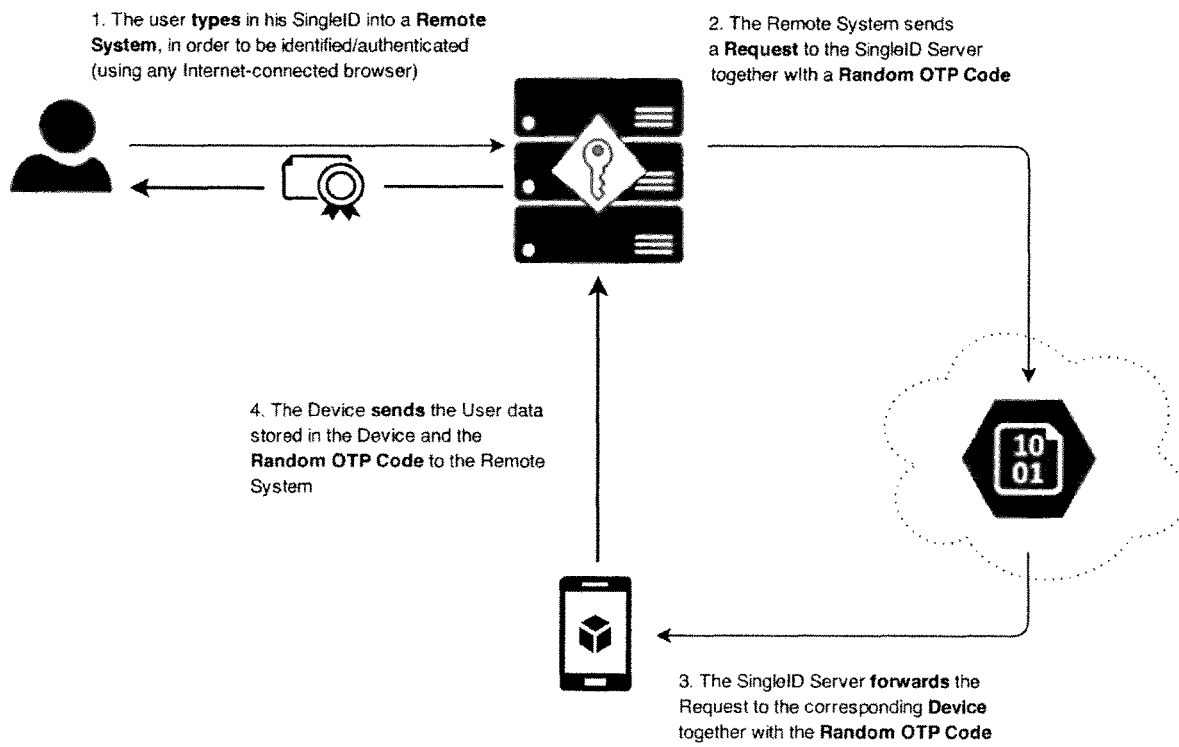
FIG. 13 is a flow diagram illustrating a two-factor authentication.

This is illustrated in FIG. 13. Accordingly, in step 1. a user enters his token ID 70 into an interface of the recipient system (remote system). The interface may be, for instance, a web interface accessed via user's browser connected to Internet. However, the present invention is not limited thereto and the interface may also be an interface provided by an app or the like. Via the user interface, a request for authentication including the token ID together with a random one time password (OTP) is sent to the authentication server by the recipient system (cf. step 2. in FIG. 13). For instance, the token ID may be an 8-digit code, wherein the digits may be hexadecimal. However, the token ID may also have any other format. The OTP password may be randomly generated for a session, i.e. the OTP may be generated by the recipient system once and remain active during the session, i.e. while the user is logged in into the system with his token ID. The authentication server checks the token ID and transmits a request for authentication to the PED together with the random OTP code as shown in step 3. in FIG. 13. The PED prompts the user to confirm his authenticity to the recipient system in step 4. by sending to the recipient system user data stored in the PED and the random OTP. The recipient system checks the OTP, receives the user data and logs the user in.

Figure 14:
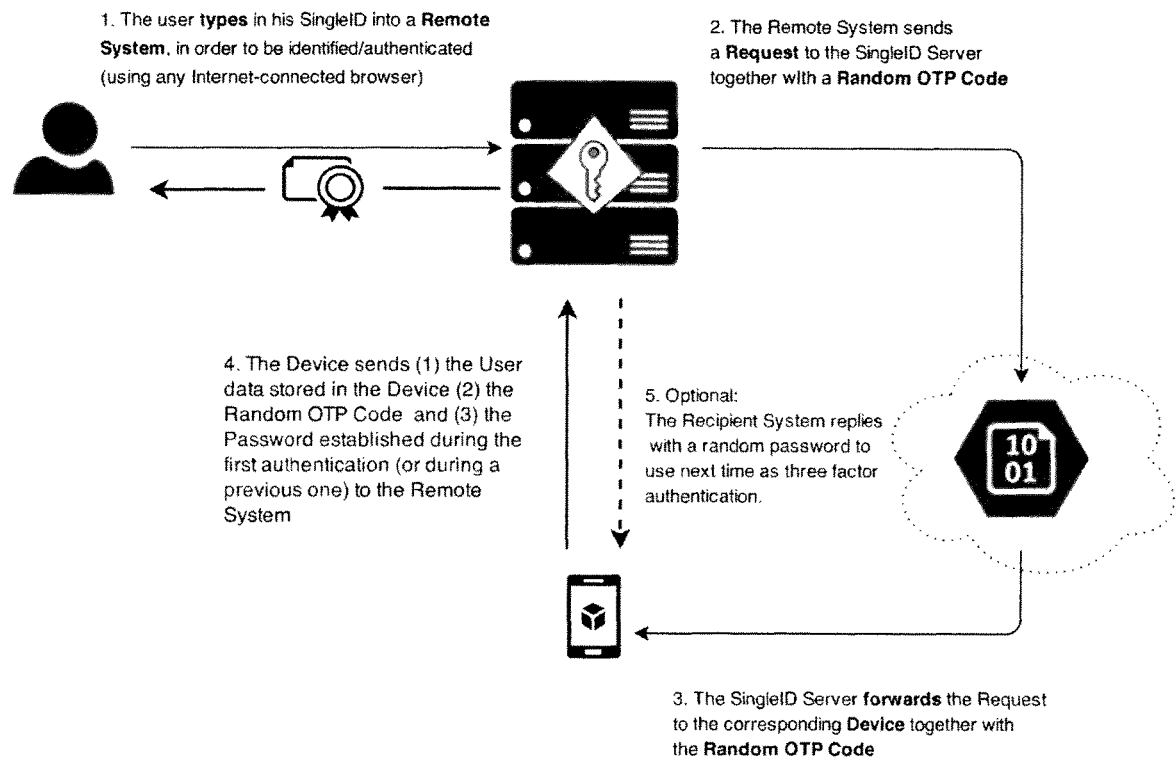
FIG. 14 is a flow diagram illustrating a three-factor authentication.

FIG. 14 illustrates a 3-factor authentication. As can be seen, steps 1 to 4 correspond to those described above with reference to FIG. 13. In addition thereto, a further security measure is provided. In particular, after the recipient system logs in the user (i.e. after the handshake between the recipient system and the PED, including the exchange of OTP and the RP) for the first time or any time, the recipient system generates a random password (RP) in step 5. and provides the RP to the PED. The PED then (i.e. after the RP was assigned for the first time) uses the currently stored RP as a further authentication means. In particular, in step 4, the PED provides the recipient system not only with the user data and the OTP, but also with the RP which was obtained from the recipient device at the last (previous) authentication, i.e. after the last handshake.

In other words, during the first (or in any event the preceding) handshake, the recipient system replies with a password, which the PED saves and sends back in the next authentication instance. Thus, the user is authenticated by three factors: (1) a token ID (such as an 8 digit hexadecimal code, or anything else), (2) the random OTP code generated by the recipient system, and (3) the previously exchanged password received by the PED from the recipient system (during the preceding authentication), RP. Proceeding in such way enables a user-blind authentication, in which the third factor (RP) is not knowable to the authentication server. Accordingly, even if all user (personal) data stored in the PED were known to an attacker, and even if the attacker had full access to the authentication server database and could hack the server to forward the request to his PED instead of the PED of the authenticated user, the attacker cannot login as the user into the recipient system because the third factor authentication is stored only on the device, i.e. not in the authentication server.

The random password (RP) may be issued by software plug-in on the recipient system and only exchanged directly between the recipient system and the user device. The RP may be a renewable password meaning that it is newly generated at each authentication as described above. However, it is noted that the present invention is not limited thereto and the RP may also be a fixed password, assigned at the first log-in and used thereafter.

The enhanced level of security provided by the above described authentication system and method can be used as an authentication platform not only for any kind of web stores, portals, online services and the like, but also in electronic banking (online and/or mobile banking). This authentication provides an easier and cheaper alternative to the currently used SMS- or dedicated, time-synchronized token-based authentication procedures while providing a user with a more convenient access without necessity to enter further codes in the recipient system.

Thus, in addition to the above embodiments, the recipient system does not only store the OTP per user but also the current RP per user in order to compare the stored OTP and RP respectively with the OTP and RP received from the PED of the user. The PED is also further configured to store the last RP received from the recipient system and to transmit it together with the OTP received from the authentication server to the recipient system.

According to an exemplary embodiment, combinable with any of the above described embodiments, the PED has an application stored therein, which prompts the user to set a PIN (personal identification number). After the user enters the PIN, the PED stores the PIN in a memory. The application may be downloaded by the user. The application further causes the PED to encrypt and/or decrypt the user data stored in the PED with a key generated on the basis of both PIN and the encryption/decryption key received from the authentication server. Thus, instead of just splitting encryption keys on the server and the user data in separate PED's memories, the decryption key generated and stored on the authentication server side is combined with a user-generated PIN on the client- (device-) side. The combination may be performed by means of a simple concatenation of the key and PIN strings. For instance, a key "asdfghzumo" can be combined with the PIN "1234" to form the key "asdfghzumo1234". However, it is noted that the combination may be performed in any way, for instance by adding the PIN value to the key or by any other function of the key and PIN.

The PED may provide an opportunity to the user to set the PIN and, at the same time, a default PIN preset for the case that the user does not enter a PIN. If the user does not change this PIN using the application, then the default PIN is used to generate the encryption and decryption key. However, the present invention is not limited thereto and the user may be required to set the PIN before starting to use the authentication method.

In particular, according to an embodiment of the invention, the present device is a network structure used by a computer-implemented authentication method for allowing a user having a personal electronic device to authenticate to a recipient system. The PED may be any device such as a mobile phone, laptop, tablet computer, or the like. The recipient system may be any system requiring a user authentication such as an e-commerce website, utilizing either another device such as a kiosk, ATM, remote workstation, computer, any other electronic device with input means for inputting the token ID, or even on the same personal electronic device for interfacing the user. Other non-limiting examples of use scenarios for the present authentication approach are corporate intranets or applications, authentication for financial transactions, authentication for building or vault entry, car/bicycle/boat renting or the like.

The present invention can be employed for any authorization/approval of actions, e.g. transactions such as electronic banking. In such cases the user may already be logged-in to a system (e.g. bank's mobile banking app or bank's secure website) and be willing to make a money transfer. With the present authentication approach, the user may merely be prompted to confirm (for instance by clicking a corresponding button in the mobile banking app or bank website) the transaction and then the bank's back end (corresponding to the recipient system) generates a push notification containing, e.g. BIC, IBAN of the beneficiary as well as the amount of the transaction and an "approve" button, and sends the generated form to the user's PED which displays the corresponding interface for approving the transaction to the user. The user may then just approve the transaction on the PED and with that approval (which includes the OTP and the RP as described above) the user authorizes the transaction. There is no need to input any data such as a TAN code manually into the banking app or the bank website.

It is noted that in the above example, instead of being prompted each time (i.e. at each transaction in the online banking system) for an input of the token ID, the recipient system may receive the token ID once and save it. For example, upon setting up the online banking in the bank's branch office the customer gives his token ID (of the device he wishes to use for online banking authentications) to the bank employee, thereby associating that token ID to his IBAN. In other words, the bank (recipient system) stores the token ID and uses it in each further transaction of the user. Therefore, when asked to approve ("sign") the transaction in the online banking form, the form does not need to prompt the user for the token ID again—it already has the token ID. By clicking on the "sign" button the plug-in integrated in the bank's server will directly trigger the authentication request, which in this case will include for example beneficiary, BIC, and IBAN and the amount to be transferred. The user will then receive the request on his phone, click "authorize" or "yes" and thereby approve and authorize the transfer.

However, this is only one of the possible deployments of the present invention. The present invention may also be used to log-in to a recipient system such as an e-shop and, in addition, to provide the recipient system with some user data stored on the PED such as personal user data.

The method comprises the steps listed below.

First, an authentication server is provided that is able to communicate with the personal electronic device (PED) and the recipient system through a network. Such an authentication server may be connected to the Internet, for example, along with a PED of the user and the recipient system.

Before being able to use the authentication method, the user establishes an account on the authentication server, storing personal information of the user into a memory of the PED, and uniquely identifying the user's personal electronic device, such as through a unique PED ID or some function thereof, for example. The authentication server preferably communicates with the PED through a mobile application running on the PED, such mobile application being downloaded to the PED by the user from the authentication server or elsewhere. The mobile application communicates the personal information of the user and the unique PED ID to the recipient system at the direction of the authentication server, all preferably through an encrypted connection. Preferably the user establishes his account on the authentication server through the mobile application running on the PED, not having to interact with the authentication server directly.

The authentication method establishes a unique token ID for the user which is preferably easy to remember and simple to type. Upon interacting with the recipient system, the user is prompted for his token ID. The recipient system, upon receiving the user's token ID, communicates with the authentication server to request login or registration information from the PED directly, referencing the user's token ID. The authentication server, upon receiving the information request from the recipient system, sends an authentication request to the user's PED, which prompts the user for a decision to proceed with authentication at the recipient system or not, and if so, to select a subset of the user's personal information that the PED is authorized to submit to the recipient system through the network. The user, if deciding to proceed with authentication, selects the subset of the user's personal information to send to the recipient system and instructs the PED to proceed. The PED retrieves the subset of personal information from its memory and sends same to the recipient system, preferably through an encrypted connection.

The recipient system receives the subset of personal information and either identifies or authenticates the user thereby, establishing a user session. The user is subsequently registered and logged into the recipient system. After the user performs a transaction, after a preset time of inactivity, or after the user overtly logging off of the recipient system, the session ends and the user would have to repeat the above process to log back into the recipient system.

The present invention is a system that reduces the burden of securing user information at recipient sites, thereby lowering the overhead costs for such recipient systems. The present invention reduces the burden on the user of having to remember multiple, unique, and complex passwords, one for each recipient system he wishes to use, and further eliminates the need for the user to enter his personal information at every site. The present system eliminates the need for the user having to remember to update his information if it changes across all of the sites he uses. Further, the present invention results in the personal information of each user being more current for any given recipient system, and retains personal information with the user instead of on a remote data storage location on the network, for example. Other features and advantages of the present invention will become apparent from the following more detailed description, taken in conjunction with the accompanying drawings, which illustrate, by way of example, the principles of the invention.

In accordance with still another aspect of the present invention, a computer readable medium storing instructions that, when executed by the respective processor, perform any of the above described methods. The medium may be distributed in the network structure, for instance, its parts are stored in the PED, in the authentication server and in the recipient device as described above. Thus, the portion of the instructions controlling the PED is stored in the program memory of the PED. This may be implemented by storing an app on the PED which controls the access to the user data as described above. Moreover, the recipient system may store a plug-in implementing the instructions to perform the OTP and RP generation and comparison, interacting with the PED and the authentication server and providing an interface to the user for entering his token ID as described above. Similarly, the authentication server instructions may be stored in a separate server device including or being connected to a user database.

It is noted that the user may use for entering the token ID the interface provided by the recipient system such as a web page. This may be displayed on any device, for instance a laptop, a desktop PC or a tablet or the PED of the user. However, the present invention is in no way limited to this approach and the token ID may be entered from any other interface such as an ATM, a kiosk, or a cash register or via any other software and/or hardware application.

An authentication server for enabling a user with a personal electronic device to register and/or login to a recipient system via a network may include: an account managing means for establishing an account for the user by uniquely identifying the user's personal electronic device and assigning a token ID to the user, a token generating means for automatically generating the token ID, a communication means for communicating via the network with both the personal electronic device and the recipient system, configured to: receive from the recipient system a token ID of a user with a random code, and upon receipt of the token ID and the random code from the recipient system, send an authentication request to the user's PED including the random code.

Correspondingly, the recipient system may include random code generating means for generating a random code (OTP) and for generating the random password (RP); communication means for prompting user to provide the token ID and to request the authentication server for authentication of the user with the token ID and the OTP; as well as authenticity verification means for checking whether a OTP random code received from the user matches the OTP random code provided for the same user to the authentication server. The authenticity verification means may further be configured to check whether an RP received from the PED matches the RP stored. Moreover, the recipient may be configured to generate a new RP upon each successful user authentication.

The personal electronic device may include storage for storing the user data in encrypted form, communication means for communicating with the recipient system and the authentication server as described above, and encryption/decryption means to perform encryption and decryption of user's data.

In other words, a computer-implemented authentication method provided by an exemplary embodiment of the present invention is for allowing a user having a personal electronic device to authenticate, confirm a transaction, register and/or login to a recipient system, the method comprising the steps a) to j) which are described in the following. In step a) an authentication server is provided which is in communication on a network with the personal electronic device and the recipient system. In step b) the authentication server uniquely identifies the user's personal electronic device in the authentication system and assigns a token ID to the user (i.e. to the user's PED). In step c) in some embodiments, the personal information of the user is stored in a memory of the PED. In step d) the recipient system prompts the user for his unique token ID. In step e) the recipient system upon receiving the user's token ID communicates to the authentication server the user's entered token ID. It is noted that the token ID may be received by manually entering the token ID to the user interface (a browser, a numeric keyboard device, etc.) or by automatically providing the token ID for instance by reading it from a card (magnetic or chip) or any other NFC tag or any other storage+communication means or by providing the token ID automatically by an application in the PED. When the recipient system receives the token ID, it may generate a one-time password (OTP) and provide it to the authentication server together with the token ID (and, in some embodiments, may additionally generate a request for transmission of certain user data stored in the PED). In step f) the authentication server sends an authentication request to the user's PED together with the OTP and the PED (and, in some embodiments, a request for transmission of certain user data stored in the PED), and then prompts the user for a decision to proceed with authentication at the recipient system (and, in some embodiments, the transmission of certain user data stored in the PED) or not. In step g) the user, if deciding to proceed with authentication, authorizes the authentication request (and, in some embodiments, the PED to send the personal information requested) to the recipient system. If the user does not authorize the PED to do so, the authentication procedure (and, in some embodiments, the transmission of the personal data requested) is terminated and the user is not authenticated, registered and/or logged-in and/or the transaction is not approved. In step h) the PED, if so requested by the authentication request of the recipient system, retrieves the personal information and sends the personal information to the recipient system. The PED may send the personal information to the recipient system together with the OTP received from the authentication server. The PED may further send the personal information to the recipient system together with a random password (RP) stored in the PED memory. The random password is generated by the recipient system and has been provided to the PED. The recipient system may provide the password once, upon the first authentication and the PED may store it and use it in each further procedures. Alternatively, the recipient system may newly generate the RP and provide it to the PED upon each successful authentication. In step i) the recipient system receives the personal information and identifies the user thereby, if requested. The user is subsequently registered and logged into the recipient system. As mentioned above, this is not a limiting feature but rather an embodiment. In general, neither of registration, log-in or personal information transmission must be performed. The authentication and/or log-in and-or registration and/or approval of a transaction may be conditioned on an affirmative comparison of the OTP generated and stored in the recipient system with the OTP received from the PED and/or on successful authentication performed by comparing the RP generated and stored in the recipient system with the RP received from the PED. If the OTPs match (or if both the OTPs and the RPs match), then the user is authenticated and logged in. If the OTPs do not match (or the RPs do not match), then the user is not authenticated and the authentication procedure is terminated without allowing the user to log in.

In the authentication method, the personal information in step c) may be differentiated on the personal electronic device between at least an anonymous subset, a personal subset, and an economic subset or any other subset as the case may be; and wherein the recipient system in step d) prompts the user for his unique token ID and informs the user of a type of subset of the personal information required to register and/or login; and wherein the personal information in steps f), g) and i) corresponds to either the anonymous subset, the personal subset, or the economic subset of the user's personal information or any other subset thereof, as the case may be. The memory of the personal electronic device in step c) may be a first non-transitory computer-readable storage medium accessible by the personal electronic device. The personal information of the user in step c) may be encrypted and stored on the first non-transitory computer-readable storage medium, the encryption based on an encryption key generated by the authentication server and stored on a second non-transitory computer-readable storage medium; and wherein in step h) the personal electronic device retrieves the encryption key from the authentication server, decrypts the personal information, and sends the decrypted personal information of the user to the recipient system. The token ID assigned by the authentication server in step b) may be based on a unique identifier of the user's personal electronic device and/or a random token key established by the authentication server, and further including the step j) in which the user is able to initiate generation of a new token ID based on the unique identifier of the user's personal electronic device and/or the random token key of the authentication server at any time.

According to an aspect of the present invention, a non-transitory computer-readable storage medium is provided on the PED, the recipient system and the authentication server, respectively, for storing a set of instructions that, when executed by the respective processor, cause it to perform operations as described above, comprising: b) establishing an account for a user on an authentication server that is in communication on a network with a personal electronic device and a recipient system, by uniquely identifying the user's personal electronic device in the authentication system and assigning a token ID to the user; c) storing personal information of the user on a memory accessible to the personal electronic device; d) the recipient system prompting the user for his unique token ID; e) the recipient system upon receiving the user's token ID communicating with the authentication server the user's entered token ID; f) the authentication server sending an authentication request to the user's personal electronic device which prompts the user for a decision to proceed with authentication at the recipient system or not (as well as, in some embodiments, a request for certain personal data stored on the personal electronic device); g) the personal electronic device sending the personal information to the recipient system (if so requested in the authentication request of the recipient system and) if authorized to do so by the user; h) the personal electronic device retrieving the personal information and sending the personal information to the recipient system (if applicable); and i) the recipient system receiving the personal information and identifying the user thereby (if applicable), the user subsequently being registered and/or logged into the recipient system. Correspondingly, an authentication system is provided for allowing a user having a personal electronic device to register and/or login to a recipient system, the system comprising: an authentication server in communication via a network with both the personal electronic device and the recipient system, the authentication server adapted to establish an account for the user by uniquely identifying the user's personal electronic device and assigning a token ID to the user, and adapted to send an authentication request (and, in some embodiments a request for certain personal data stored on the personal electronic device) to the user's personal electronic device for a decision of the user to proceed with authentication (and data transmission, if applicable) at the recipient system or not; a software application resident on the personal electronic device adapted to store personal information of the user on a memory accessible thereto and subsequently retrieving the personal information and sending the personal information to the recipient system if so requested and when authorized by the user in response to receiving the authentication (and, if applicable, data transmission) request; a software application resident on the recipient system and adapted to prompt the user for the token ID, communicating the token ID to the authentication server, and receiving the personal information directly from the personal electronic device to authenticate and identify the user thereby; whereby in response to a transaction request by the user, the recipient system prompts the user for his unique token ID and sends the token ID to the authentication server, which sends an authentication (and, if applicable, data transmission) request to the user's personal electronic device which prompts the user for a decision to proceed with authentication at the recipient system (and data transmission, if applicable) or not, after which the personal electronic device, if authorized by the user, retrieves, if applicable, the personal information from the memory and sends the personal information to the recipient system together with the confirmation of the authentication request to identify the user thereby, the user subsequently being authenticated, registered and logged into the recipient system. As also described above, the PED may send the personal information to the recipient system together with the OTP received from the authentication server and/or with RP, which are received at the PED from the authentication server (OTP) and from the recipient system (RP) as exemplified above.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms.

Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above.

The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention. Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

Summarizing, the authentication method allows a user having a personal electronic device (PED) to login to a recipient system. Upon interacting with the recipient system, the user is prompted for his unique token ID. The recipient system generates a one-time password (OTP) and sends it to the authentication server together with the token ID and may, in addition, request certain user information. The authentication server sends an authentication request to the user's PED including the OTP, which prompts the user for a decision to proceed or not. The user, may decide to proceed with authentication, upon which the PED sends to the recipient system the OTP and a random password created by a previous handshake between recipient system and PED, (RP) stored in the PED, the recipient system authenticating the user thereby by comparing the OTP generated and received and the RP stored and received. If user information was requested, it will be provided to the recipient system together with the authentication data, i.e. the OTP and the RP.

What is claimed is:

1. An authentication system for allowing a user having a personal electronic device (PED) to authenticate to a recipient system via a network, the system comprising:
the recipient system, wherein the recipient system is configured to:
prompt the user to input a unique token ID;
receive the unique token ID from the user;
generate a one-time password (OTP);
send the token ID together with the OTP to an authentication server
generate and store a random password (RP);
send the RP to the PED;
receive directly from the PED an RP together with an OTP;
authenticate the user by comparing the generated OTP with the received OTP and comparing the generated RP with the received RP and determining that they match;
the authentication server in communication via the network with both the PED and the recipient system, wherein the authentication server is configured to:
receive from the recipient system the user's token ID and the OTP; and
send an authentication request to the user's PED, associated with the token ID, for a decision of the user to proceed with authentication at the recipient system or not, the request including the OTP;
the PED, wherein the PED is configured to:
store the RP, received from the recipient system;
prompt the user for a decision to proceed or not with authentication at the recipient system, wherein when proceeding with authentication a selected subset of the user's personal information from the PED is submitted only to the recipient system without being sent to the authentication server, whereby the authentication server does not receive any of the selected subset of the user's personal information; and
send the selected subset of the user's personal information, the RP, and the OTP to the recipient system to authenticate the user thereby, when authorized by the user.

2. The authentication system according to claim 1, wherein the recipient system is further configured to generate a new RP and send it to the PED upon each user's authentication.

3. The authentication system according to claim 1, wherein: the PED includes a first computer-readable storage medium with the user data encrypted and stored on, the encryption being based on an encryption key generated by the authentication server and stored on a PED's second computer-readable storage medium; and the PED is configured to retrieve the encryption key from the authentication server, decrypt the personal information, and send the decrypted personal information of the user to the recipient system.

4. The authentication system according to claim 3, wherein: the PED is configured by an application to prompt a user to set a personal identification number, PIN, and the encryption is further based on the PIN.

5. The authentication system according to claim 1, wherein the token ID is assigned to the user for the user's PED by the authentication server based on a unique identifier of the user's personal electronic device.

6. The authentication system according to claim 1, wherein the token ID is assigned to the user for the user's PED by the authentication server based on a random token key established by the authentication server.

7. An authentication method for allowing a user having a personal electronic device (PED) to authenticate to a recipient system, the method comprising the steps:
a) the recipient system receiving a unique token ID from the user after prompting the user to input the unique token ID;
b) the recipient system, upon receiving the unique token ID, generating a one-time password (OTP) and communicating to an authentication server the received user's token ID and the OTP;
c) the recipient system generating a random password (RP) and transmitting the RP to the user's PED;
d) the authentication server sending an authentication request to the user's PED, associated with the token ID, the authentication request including the OTP;
e) the PED prompting the user for a decision to proceed or not with authentication at the recipient system, wherein when proceeding with authentication a selected subset of the user's personal information from the PED is submitted only to the recipient system without being sent to the authentication server, whereby the authentication server does not receive any of the selected subset of the user's personal information;

f) the PED enabling the user to authorize or prohibit proceeding with authentication at the recipient system;

g) the PED sending the selected subset of the user's personal information, the RP, obtained previously from the recipient system, as well as the OTP, received from the authentication server, to the recipient system;

h) the recipient system receiving directly from the PED the selected subset of the user's personal information, the RP, and the OTP and authenticating the user by comparing the generated OTP with the received OTP and comparing the stored RP with the received RP and when they match, authenticating the user.

8. The method according to claim 7, further comprising the step of, by the recipient system, generating a new RP upon each successful user's authentication and providing the new RP to the user's PED.

9. The authentication method according to claim 7 wherein the selected subset of the user's personal information is encrypted and stored on a first computer-readable storage medium, the encryption based on an encryption key generated by the authentication server and stored on a second computer-readable storage medium; and wherein in step g) the PED retrieves the encryption key from the authentication server, decrypts the encrypted selected subset of the user's personal information, and sends the decrypted selected subset of the user's personal information to the recipient system.

10. The authentication method according to claim 7 wherein the token ID is assigned to the user for the user's PED by the authentication server based on at least one of a unique identifier of the user's personal electronic device and a random token key established by the authentication server.

11. The authentication method of claim 9 further comprising the step of prompting the user to set a personal identification number, PIN, by the PED, wherein the encryption and decryption of the selected subset of the user's personal information is further based on the PIN.

12. An authentication method for allowing a user having a personal electronic device (PED) to authenticate to a recipient system, the method to be performed on the recipient system and comprising the steps of:

prompting the user to manual enter a unique token ID;
receiving the unique token ID from the user;
upon receiving the unique token ID, generating a one-time password (OTP) and communicating to an authentication server the user's entered token ID and the OTP;
generating a random password (RP) and transmitting the RP to the PED;
receiving directly from the PED a selected subset of the user's personal information, the RP, obtained previously from the recipient system, and the OTP, received from the authentication server, wherein the PED prompts the user for a decision to proceed or not with authentication at the recipient system and the selected subset of the user's personal information from the PED, the RP, and the OTP is submitted only to the recipient system without being sent to the authentication server when the user chooses to proceed with the authentication at the recipient system, whereby the authentication server does not receive any of the selected subset of the user's personal information;
authenticating the user by comparing the generated OTP with the received OTP and comparing the stored RP with the received RP and when they match authenticating the user.

13. A non-transient computer-readable storage medium storing a set of instructions that, when executed by one or more processors, causes the one or more processors to:

a) receive, by a recipient system, a unique token ID from the user after prompting the user to input the unique token ID;

b) generate, by the recipient system upon receiving the unique token ID, a one-time password (OTP) and transmit to an authentication server the received user's token ID and the OTP;

c) generate, by the recipient system, a random password (RP) and transmit the RP to the user's personal electronic device (PED);

d) send, by the authentication server, an authentication request to the user's PED, associated with the token ID, the authentication request including the OTP;

e) prompt, by the PED, the user for a decision to proceed or not with authentication at the recipient system, wherein when proceeding with authentication a selected subset of the user's personal information from the PED is submitted only to the recipient system without being sent to the authentication server, whereby the authentication server does not receive any of the selected subset of the user's personal information;

f) enable, by the PED, the user to authorize or prohibit proceeding with authentication at the recipient system;

g) send, by the PED, the selected subset of the user's personal information, the RP, obtained previously from the recipient system, as well as the OTP, received from the authentication server, to the recipient system;

h) receive directly, by the recipient system, from the PED the selected subset of the user's personal information, the RP, and the OTP and authenticate the user by comparing the generated OTP with the received OTP and comparing the stored RP with the received RP and when they match, authenticating the user.

14. A non-transient computer-readable storage medium storing a set of instructions for allowing a user having a personal electronic device (PED) to authenticate to a recipient system, wherein the instructions, when executed by one or more processors of the recipient system, causes the one or more processors to:

prompt the user to manual enter a unique token ID;
receive, the unique token ID from the user;
generate, upon receiving the unique token ID, a one-time password (OTP) and communicating to an authentication server the user's entered token ID and the OTP;
generate a random password (RP) and transmitting the RP to the PED;
receiving directly from the PED a selected subset of the user's personal information, the RP, obtained previously from the recipient system, and the OTP, received from the authentication server, wherein the PED prompts the user for a decision to proceed or not with authentication at the recipient system and the selected subset of the user's personal information from the PED, the RP, and the OTP is submitted only to the recipient system without being sent to the authentication server when the user chooses to proceed with the authentication at the recipient system, whereby the authentication server does not receive any of the selected subset of the user's personal information;
authenticating the user by comparing the generated OTP with the received OTP and comparing the stored RP with the received RP and when they match authenticating the user.

15. An authentication method allowing a user with a personal electronic device to be authenticated by a recipient system comprising the steps of:

- connecting a personal electronic device, an authentication server, and a recipient system to a network;
- identifying the personal electronic device to the authentication server with a unique personal electronic device ID identifying the personal electronic device through the network;
- generating a unique token ID established by the authentication server based on the unique personal electronic device ID, the unique token ID sent to and stored on the personal electronic device;
- activating the recipient system to prompt a user to enter the unique token ID, wherein the unique token ID is received by the recipient system;
- generating, by the recipient system, a one-time password and a random password;
- sending from the recipient system, upon receiving the unique token ID, a communication to the authentication sever for the authentication server to request information from the personal information device, wherein the communication includes the unique token ID and the one-time password;
- sending from the recipient system the random password to the personal electronic device;
- sending from the authentication server an authorization request to the personal electronic device which prompts the user for a decision to proceed with authentication at the recipient system or not, wherein when proceeding with authentication a selected subset of the user's personal information from the personal electronic device is submitted only to the recipient system without being sent to the authentication server, whereby the authentication server does not receive any of the selected subset of the user's personal information, the authorization request including the one-time password;
- receiving, by the recipient system, directly from the personal electronic device the selected subset of the user's personal information, the random password, obtained previously from the recipient system, and the one-time password, received from the authentication server; and
- comparing, by the recipient system, the generated one-time password with the received one-time password and comparing the generated random password with the received random password and authenticating the user when they match.

* * * * *